US010843605B2

(12) United States Patent
Johnson et al.

(10) Patent No.: US 10,843,605 B2
(45) Date of Patent: Nov. 24, 2020

(54) HEADREST-HEIGHT ADJUSTER FOR JUVENILE SEAT

(71) Applicant: Dorel Juvenile Group, Inc., Foxboro, MA (US)

(72) Inventors: Jason H. Johnson, Brownstown, IN (US); Ersen Boran, Chalfont, PA (US); Scott M. Holmecki, Bargersville, IN (US); Gary E. Reuther, Warminster, PA (US); Nicholas B. Max, Quakertown, PA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 16/381,596

(22) Filed: Apr. 11, 2019

(65) Prior Publication Data
US 2019/0344694 A1    Nov. 14, 2019

Related U.S. Application Data

(60) Provisional application No. 62/669,430, filed on May 10, 2018.

(51) Int. Cl.
*B60N 2/26* (2006.01)
*B60N 2/28* (2006.01)
*B60N 2/806* (2018.01)
*B60N 2/809* (2018.01)
*B60N 2/812* (2018.01)
*B60N 2/821* (2018.01)

(52) U.S. Cl.
CPC ........... *B60N 2/812* (2018.02); *B60N 2/2851* (2013.01)

(58) Field of Classification Search
CPC .............................. B60N 2/2851; B60N 2/812
USPC .................................. 297/250.1, 251–256.16
See application file for complete search history.

(56) References Cited

U.S. PATENT DOCUMENTS

| 1,747,505 | A | 2/1930 | Emmert |
| 2,806,723 | A | 9/1957 | Fairclough |
| 3,334,931 | A | 8/1967 | Holt et al. |
| 3,734,441 | A | 5/1973 | Lux |
| 4,552,405 | A | 11/1985 | Wiers |
| 5,595,410 | A | 1/1997 | Wilson et al. |
| 5,913,783 | A | 6/1999 | Weener et al. |
| 6,030,047 | A * | 2/2000 | Kain ................ B60N 2/2812 297/250.1 |
| 6,282,841 | B1 | 9/2001 | Santa Cruz et al. |
| 6,428,099 | B1 * | 8/2002 | Kain ................ B60N 2/2806 297/250.1 |
| 6,491,348 | B1 * | 12/2002 | Kain ................ B60N 2/2812 297/250.1 |
| 6,607,242 | B2 | 8/2003 | Estrada et al. |
| 6,688,685 | B2 * | 2/2004 | Kain ................ B60N 2/2812 297/250.1 |
| 6,705,675 | B1 * | 3/2004 | Eastman ........... B60N 2/2806 297/250.1 |
| 6,736,457 | B2 | 5/2004 | Elio et al. |
| 6,908,151 | B2 * | 6/2005 | Meeker ............ B60N 2/2806 297/250.1 |

(Continued)

*Primary Examiner* — Rodney B White
(74) *Attorney, Agent, or Firm* — Barnes & Thornburg LLP

(57) ABSTRACT

A child car seat includes a seat bottom, a backrest extending upwardly from the seat bottom, and a movable headrest mounted to be moved on the backrest. The child car seat also includes a controller for changing the elevation of the movable headrest relative to the underlying seat bottom.

22 Claims, 10 Drawing Sheets

(56) References Cited

U.S. PATENT DOCUMENTS

| | | | |
|---|---|---|---|
| 7,021,710 B2* | 4/2006 | Kain | B60N 2/2851 297/250.1 |
| 7,032,969 B1* | 4/2006 | Campbell | B60N 2/2851 297/256.1 |
| 7,055,903 B2* | 6/2006 | Balensiefer | B60N 2/2821 297/250.1 X |
| 7,195,314 B2* | 3/2007 | Spence | B60N 2/2851 297/250.1 X |
| 7,246,852 B2* | 7/2007 | Balensiefer | B60N 2/2851 297/250.1 |
| 7,306,284 B2* | 12/2007 | Horton | B60N 2/2812 297/250.1 |
| 7,306,287 B2 | 12/2007 | Linardi et al. | |
| 7,322,647 B2* | 1/2008 | Munn | B60N 2/2851 297/250.1 |
| 7,669,926 B2* | 3/2010 | Balensiefer | B60N 2/2851 297/250.1 |
| 7,857,385 B2* | 12/2010 | Zink | B60N 2/2851 297/250.1 |
| 7,896,322 B2 | 3/2011 | Geler et al. | |
| 7,901,003 B2* | 3/2011 | Meeker | B60N 2/2806 297/250.1 |
| 7,954,895 B2* | 6/2011 | Freeman | B60N 2/2851 297/250.1 |
| 8,087,725 B2* | 1/2012 | Hutchinson | B60N 2/2806 297/250.1 |
| 8,272,690 B2* | 9/2012 | Brandl | B60N 2/2851 297/250.1 |
| 8,579,369 B2* | 11/2013 | Gaudreau, Jr. | B60N 2/2812 297/250.1 X |
| 8,585,138 B2* | 11/2013 | Gaudreau, Jr. | B60N 2/2812 297/250.1 X |
| 8,632,127 B2* | 1/2014 | Brunick | B60N 2/2851 297/250.1 |
| 8,764,108 B2* | 7/2014 | Gaudreau, Jr. | B60N 2/2812 297/250.1 |
| 8,845,021 B2* | 9/2014 | Hou | B60N 2/2812 297/250.1 |
| 8,905,476 B2* | 12/2014 | Davis | B60N 2/26 297/250.1 |
| 9,016,782 B2* | 4/2015 | Xu | B60N 2/2851 297/250.1 |
| 9,022,470 B2* | 5/2015 | Fujita | B60N 2/265 297/219.12 |
| 9,022,471 B2* | 5/2015 | Gaudreau, Jr. | B60N 3/101 297/250.1 X |
| 9,022,472 B2* | 5/2015 | Chen | B60N 2/2851 297/250.1 |
| 9,067,516 B2* | 6/2015 | Hutchinson | B60N 2/2812 |
| 9,162,593 B2* | 10/2015 | Spence | B60N 2/2845 |
| 9,211,817 B2* | 12/2015 | Leese | B60N 2/2851 |
| 9,346,377 B2* | 5/2016 | Xu | B60N 2/2851 |
| 9,347,472 B2 | 5/2016 | Lambertson, Jr. et al. | |
| 9,415,707 B2* | 8/2016 | Bohm | B60N 2/2851 |
| 9,878,643 B2* | 1/2018 | Johnson | B60N 2/2851 |
| 10,632,871 B2* | 4/2020 | Schmitz | B60N 2/2851 |
| 2002/0043837 A1* | 4/2002 | Kain | B60N 2/2851 297/250.1 |
| 2004/0124676 A1* | 7/2004 | Kain | B60N 2/2851 297/250.1 |
| 2004/0189068 A1* | 9/2004 | Meeker | B60N 2/2851 297/250.1 |
| 2006/0273637 A1* | 12/2006 | Yumoto | B60N 2/2866 297/250.1 |
| 2007/0039139 A1* | 2/2007 | Campbell | B60N 2/2866 24/136 R |
| 2007/0057545 A1* | 3/2007 | Hartenstine | B60N 2/2881 297/250.1 |
| 2007/0063556 A1* | 3/2007 | Santamaria | B60N 2/2851 297/250.1 |
| 2007/0120403 A1* | 5/2007 | Drexler | B60N 2/2803 297/250.1 |
| 2007/0236061 A1* | 10/2007 | Meeker | B60N 2/20 297/250.1 |
| 2007/0246982 A1* | 10/2007 | Nett | B60N 2/2851 297/250.1 |
| 2008/0018152 A1* | 1/2008 | Vadai | B60N 2/286 297/255 |
| 2008/0136232 A1* | 6/2008 | Hutchinson | B60N 2/2875 297/250.1 |
| 2010/0264705 A1* | 10/2010 | Karremans | B60N 2/2812 297/250.1 |
| 2011/0062756 A1* | 3/2011 | Campbell | B60N 2/2812 297/250.1 |
| 2012/0153690 A1* | 6/2012 | Gaudreau, Jr. | B60N 2/2851 297/250.1 |
| 2012/0181829 A1* | 7/2012 | Williams | B60N 2/2806 297/250.1 |
| 2013/0175835 A1* | 7/2013 | Fujita | B60N 2/60 297/250.1 X |
| 2015/0035329 A1* | 2/2015 | Sparling | B60N 2/43 297/216.11 |
| 2016/0114705 A1* | 4/2016 | Morgenstern | B60N 2/2866 297/250.1 X |
| 2016/0114706 A1* | 4/2016 | Hutchinson | B60N 2/2851 297/250.1 X |
| 2016/0362025 A1* | 12/2016 | Heisey | B60N 2/2851 |
| 2019/0092194 A1* | 3/2019 | Johnson | B60N 2/815 |
| 2019/0184864 A1* | 6/2019 | Denbo | B60N 2/286 |
| 2019/0210493 A1* | 7/2019 | Woods | B60N 2/885 |
| 2020/0047647 A1* | 2/2020 | Oswald | B60N 2/2806 |

\* cited by examiner

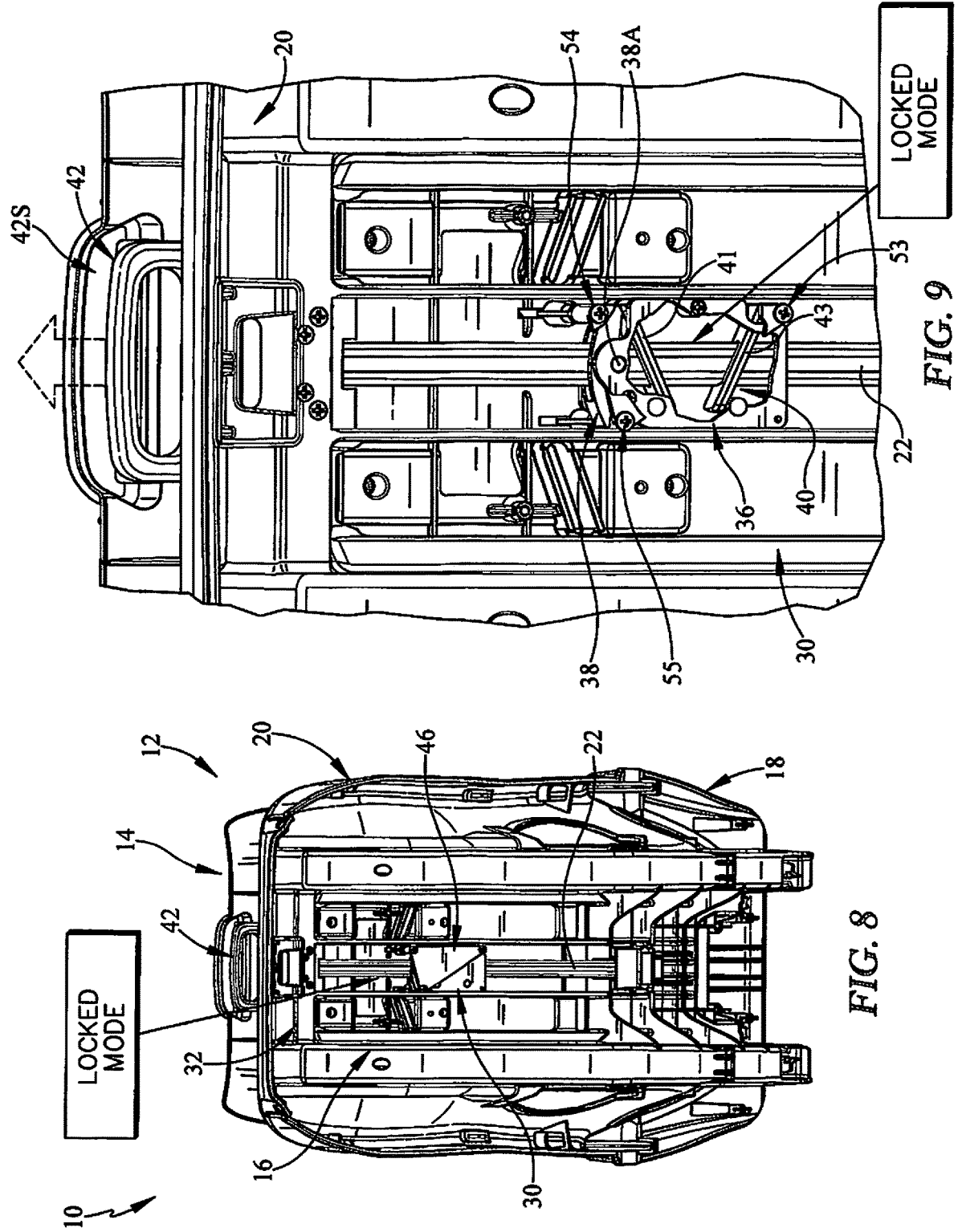

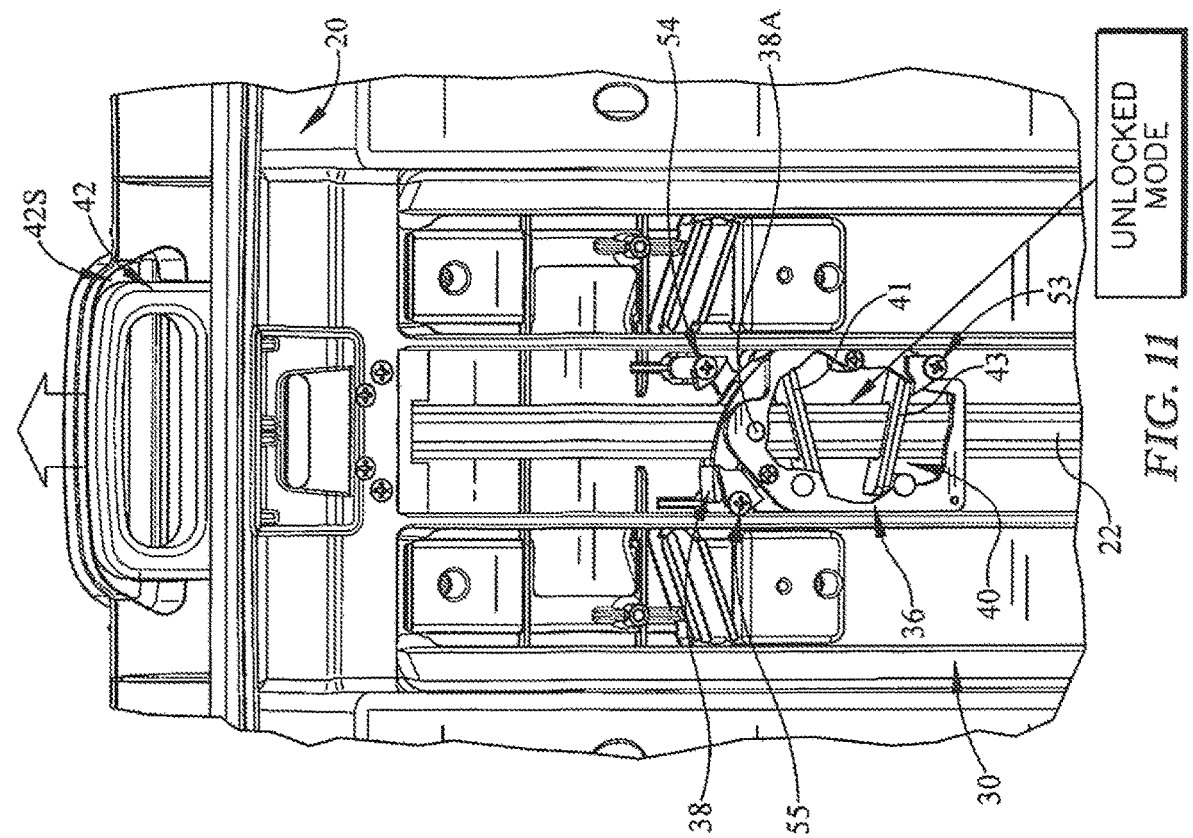
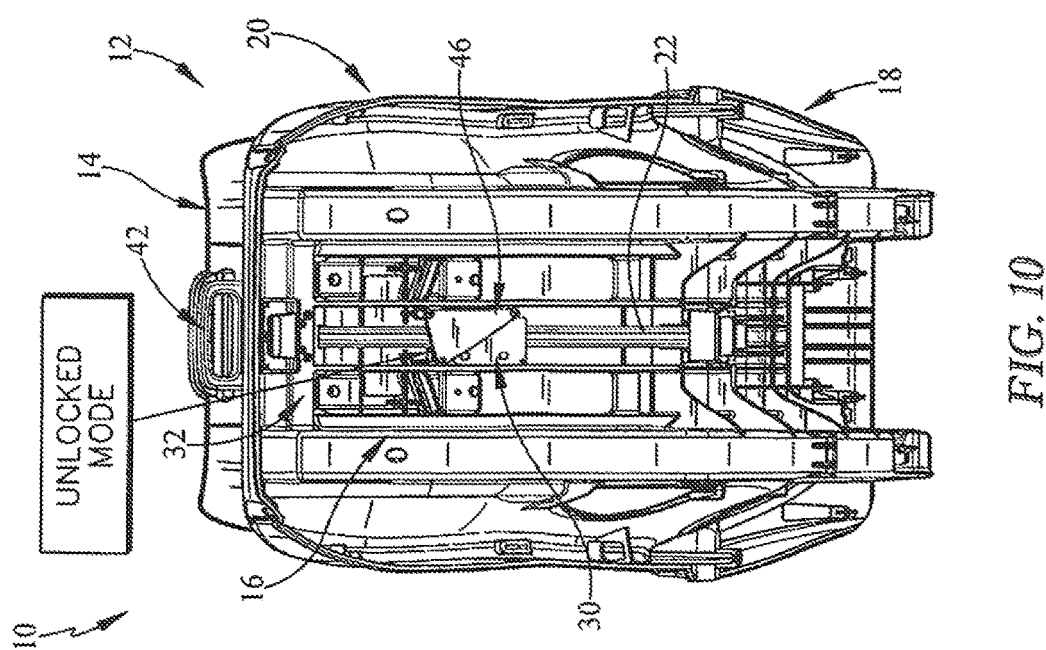

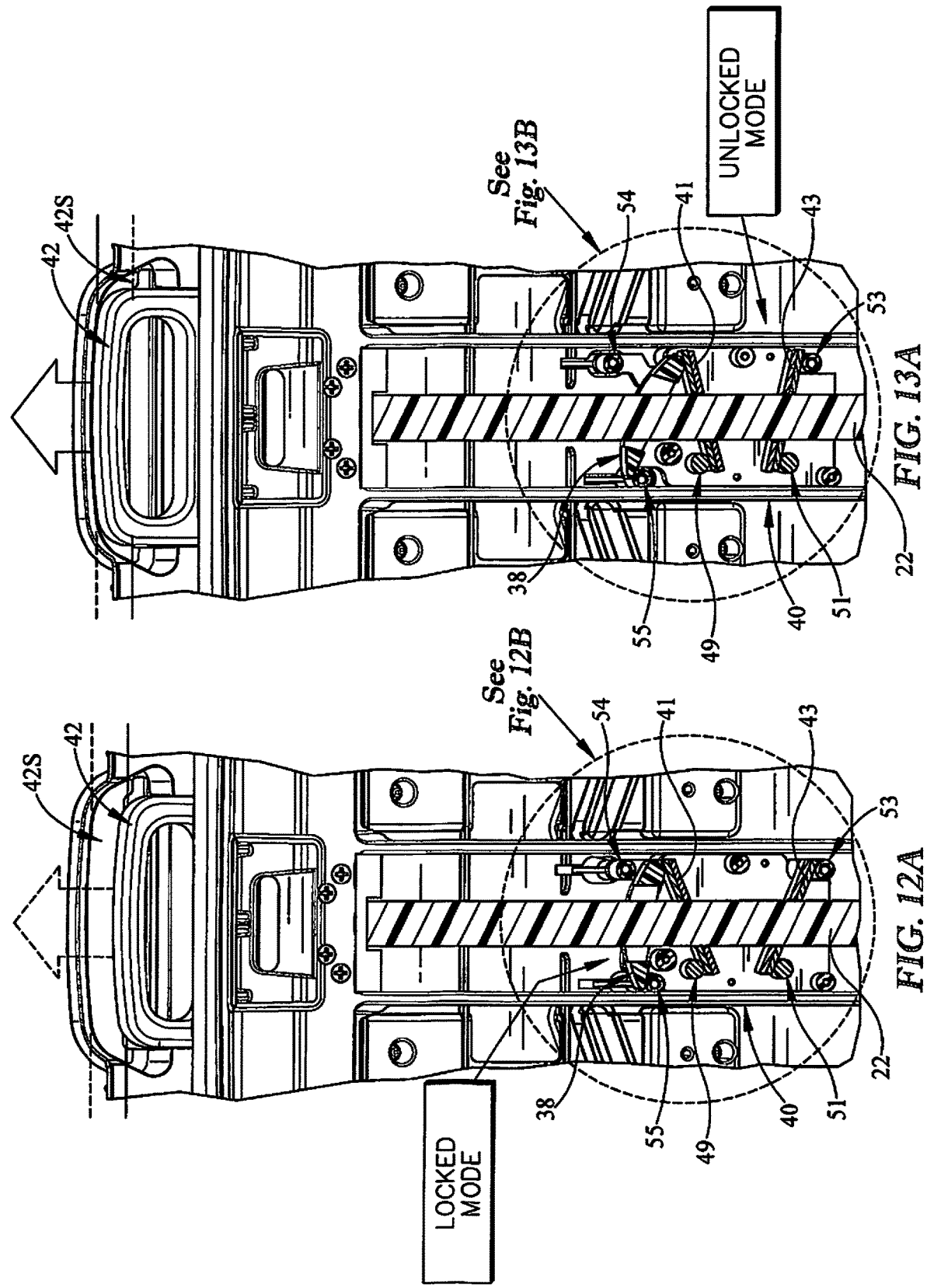

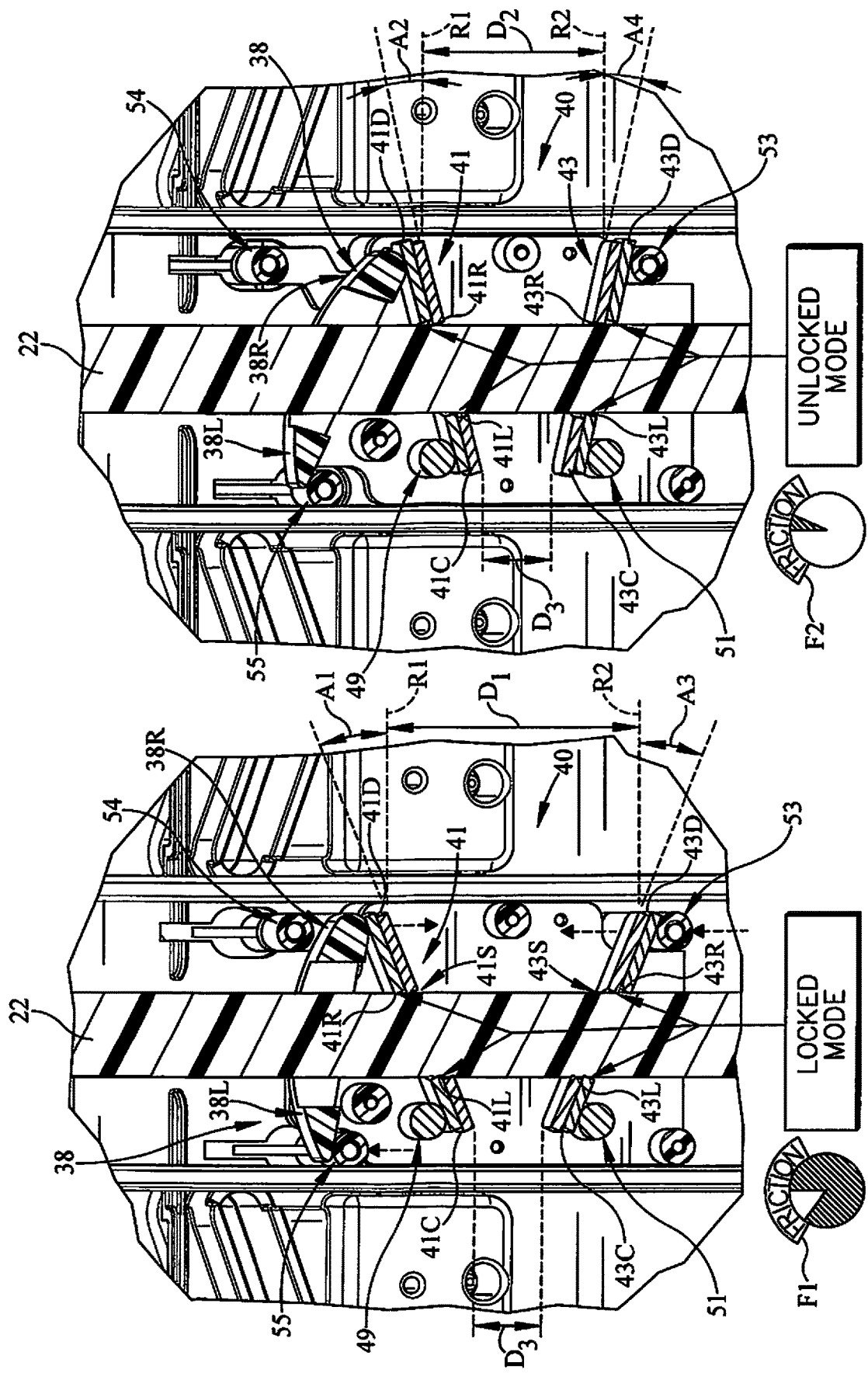

US 10,843,605 B2

HEADREST-HEIGHT ADJUSTER FOR JUVENILE SEAT

PRIORITY CLAIM

This application claims priority under 35 U.S.C. § 119(e) to U.S. Provisional Application No. 62/669,430, filed May 10, 2018, which is expressly incorporated by reference herein.

BACKGROUND

The present disclosure relates to a child restraint, and particularly to a child restraint including a juvenile seat. More particularly, the present disclosure relates to a child restraint including a movable headrest included in the juvenile seat.

SUMMARY

According to the present disclosure, a juvenile seat includes a seat bottom and a seat back coupled to the seat bottom and arranged to extend upwardly away from the seat bottom. In illustrative embodiments, the seat back includes a backrest coupled to the seat bottom in a fixed position relative to the seat bottom and a movable headrest coupled to the backrest to move up and down relative to the backrest.

In illustrative embodiments, the seat back further includes a headrest-height controller configured to control a height of the movable headrest above the seat bottom. The headrest-height controller includes an actuator handle that is located on a front top side of the movable headrest so that it can be gripped easily by the caregiver and moved relative to the backrest and the movable headrest to unlock the movable headrest so that it is free to be moved up and down on the backrest to assume a different elevation above the seat bottom.

In illustrative embodiments, the headrest-height controller may be operated by a caregiver to change from a LOCKED mode in which the headrest-height controller functions to block movement of the movable headrest relative to the backrest at a selected one of any and all elevation points along a headrest-travel path between a fully raised position and a fully lowered position and an UNLOCKED mode in which the movable headrest may be moved freely up and down on the backrest by the caregiver between the fully raised position and the fully lowered position. In use, the caregiver can grip and move the actuator handle relative to the movable headrest to change the headrest-height controller from LOCKED mode to UNLOCKED mode at any elevation point of the movable headrest along the headrest-travel path to cause the movable headrest to be retained in a stationary position above the seat bottom at that selected elevation point.

In illustrative embodiments, the headrest-height controller includes a mount rail coupled to the backrest, a headrest-friction lock, and a headrest-lock release comprising an actuator handle that is movable relative to the backrest. The mount rail is arranged to lie in a fixed position on the backrest. A caregiver grips and lifts the actuator handle included the headrest-lock release to change the headrest-height controller from the LOCKED mode to the UNLOCKED mode so that the movable headrest can be moved up and down on the backrest to change elevation relative to the underlying seat bottom. The headrest-friction lock provides means for engaging the mount rail in the LOCKED mode to block movement of the movable headrest relative to the backrest at a selected one of any and all elevation points along the headrest-travel path between the fully raised position and the fully lowered position as long as a caregiver does not lift the actuator handle upwardly.

In illustrative embodiments, the headrest-friction lock includes a lock-tab unit configured to apply a first frictional force to the mount rail in the LOCKED mode of the headrest-height controller and a second frictional force to the mount rail in the UNLOCKED mode of the headrest-height controller. The first frictional force is greater than the second frictional force and is sufficient to block up-and-down movement of the movable headrest relative to the backrest at any and all points along the headrest-travel path. In one example, the second frictional force is equal to about zero.

In illustrative embodiments, a caregiver applies a lifting force to an actuator handle of the headrest-lock release to cause the lock-tab unit to apply the relatively lower second frictional force to the mount rail and, in effect, disengage from the mount rail and allow up-and-down movement of the movable headrest relative to the backrest. Once the movable headrest is moved along the headrest-travel path by the caregiver to assume a desired vertical position on the backrest, the caregiver then lets go of the actuator handle of the headrest-lock release at a selected elevation point along the headrest-travel path so that no lifting force is applied to the actuator handle and the lock-tab unit shifts automatically to engage the mount rail and apply the first frictional force to block further up-and-down movement of the movable headrest relative to the backrest at the selected one of any and all elevation points along the headrest-travel path.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is a partial rear elevation view of the child restraint of FIG. 1 showing that the headrest-height controller is in a LOCKED mode in which a headrest-friction lock of the headrest-height controller applies a first frictional force to a mount rail to block up-and-down movement of the movable headrest relative to the backrest at a selected one of any and all points along a length of the mount rail and suggesting that headrest-height controller can be changed to an UNLOCKED mode in response to application of an upward lifting force (upward double phantom arrow) applied to an actuator handle by a caregiver as shown in FIG. 3;

FIG. 3 is a view similar to FIG. 2 showing the headrest-height controller has been changed to an UNLOCKED mode in which the headrest-friction lock of the headrest-height controller applies a second frictional force to the mount rail that is less than the first frictional force to allow unhindered up-and-down movement of the movable headrest relative to the backrest along the mount rail as a result of the caregiver applying an upward lifting force (upward double solid arrow) to the actuator handle to move the actuator handle upwardly relative to the backrest and suggesting that the caregiver may move the headrest freely up or down along the backrest once the headrest-height controller has been changed to the UNLOCKED mode;

FIG. 8 is a rear elevation view of the child restraint of FIG. 1 showing the headrest-height controller is in the LOCKED mode to cause the headrest-friction lock to engage the mount rail to lock the movable headrest in a fixed position to the mount rail on the backrest;

FIG. 9 is an enlarged partial view of FIG. 8 with portions broken away to reveal that the lock-tab unit is engaged with the mount rail to block up-and-down movement of the movable headrest relative to the mount rail and to the backrest;

FIG. 10 is a view similar to FIG. 8 showing the headrest-height controller is in the UNLOCKED mode to cause the headrest-friction lock to disengage the mount rail to allow up-and-down movement of the movable headrest relative to the mount rail and backrest;

FIG. 11 is an enlarged partial view of FIG. 10 with portions broken away to reveal that the lock-tab unit has been disengaged from the mount rail allowing movement of the movable headrest relative to the mount rail and to the backrest;

FIGS. 12A-13B are a series of enlarged partial elevational views of the headrest-height controller showing that the lock-tab unit includes an upper tab and a lower tab and showing that the upper and lower tabs are configured to engage the mount rail and apply the first frictional force to the mount rail in the LOCKED mode of the headrest-height controller as shown in FIGS. 12A and 12B and are configured to shift and apply the relatively lower second frictional force in the UNLOCKED mode of the headrest-height controller as shown in FIGS. 13A and 13B;

FIG. 12A is a sectional view of the headrest-height controller of FIG. 9 showing that the upper tab and the lower tab each include inner-tab edges that are configured to engage the mount rail and apply the first frictional force to the mount rail;

FIG. 12B is an enlarged portion taken from the circled region of FIG. 12A suggesting that upward movement of the headrest-lock release engages the rocker arm and tabs to cause the tabs to disengage from the mount rail as suggested in FIGS. 13A and 13B;

FIG. 13A is a view similar to FIG. 12A showing that the upper tab and lower tab have shifted to cause the inner-tab edges to apply the relatively second frictional force to the mount rail and allow up-and-down movement of the movable headrest relative to the mount rail and the backrest; and FIG. 13B is an enlarged portion taken from the circled region of FIG. 13A showing how the rocker arm and tabs have moved to free the movable headrest for movement upwardly and downwardly along the mount rail relative to mount rail and the backrest.

DETAILED DESCRIPTION

Figure 1:
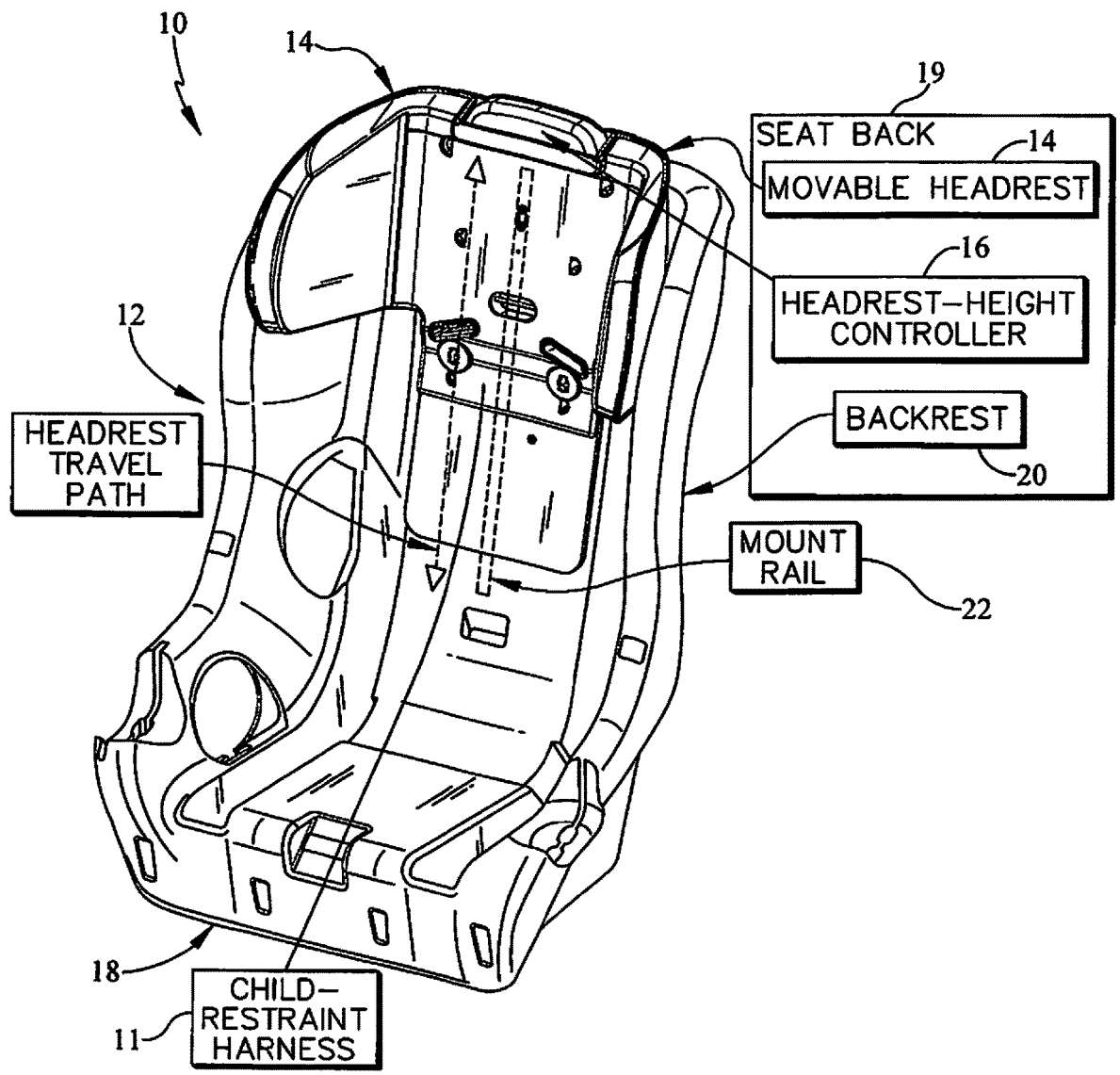
FIG. 1 is a perspective and diagrammatic view of an child restraint in accordance to the present disclosure showing that the child restraint includes a juvenile seat including a seat bottom and a seat back comprising a backrest coupled to the seat bottom, a movable headrest coupled to the backrest and arranged to move up and down relative to the backrest along a generally vertical headrest-travel path, and a headrest-height controller that may be operated by a caregiver to lock the movable headrest in a stationary position on the backrest at a selected one of any and all elevation points along the headrest-travel path as the movable headrest is moved up and down on the backrest along the generally vertical headrest-travel path.

A child restraint 10, in accordance with the present disclosure, comprises a juvenile seat 12 and a child-restraint harness 11 that is coupled to juvenile seat 12 as suggested in FIG. 1. Juvenile seat 12 includes a seat bottom 18 and a seat back 19 that is arranged to extend upwardly from seat bottom 18 as shown in FIG. 1. Seat back 19 includes a backrest 20 coupled to seat bottom 18 to lie in a fixed position relative to seat bottom 18, a movable headrest 14 arranged to move up and down relative to backrest 20, and a headrest-height controller 16 as shown illustratively in FIG. 1 and suggested diagrammatically in FIG. 4.

Figure 2:
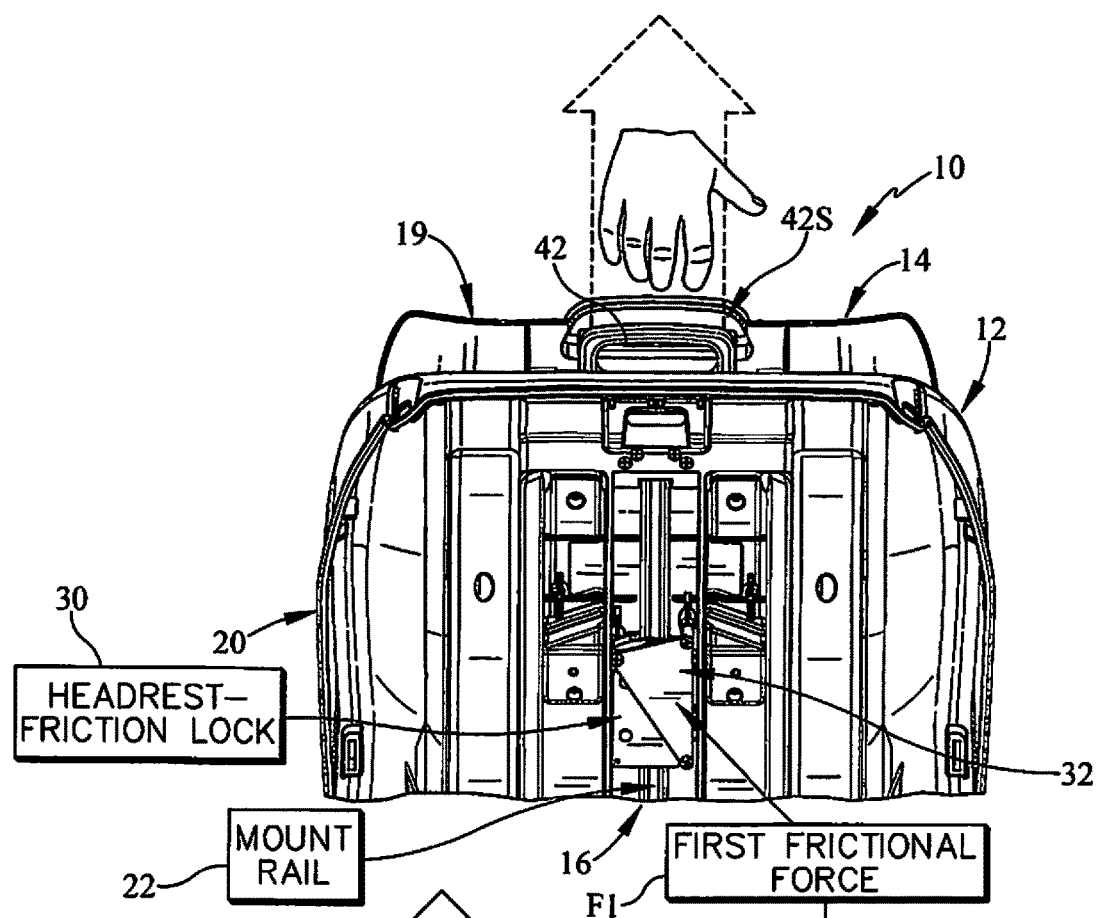
FIGS. 2 and 3 are a pair of partial rear elevation views showing how a caregiver applies a lifting force to an actuator handle included in the headrest-height controller to change the headrest-height controller from a LOCKED mode shown in FIG. 2 to an UNLOCKED mode shown in FIG. 3.
Figure 3:
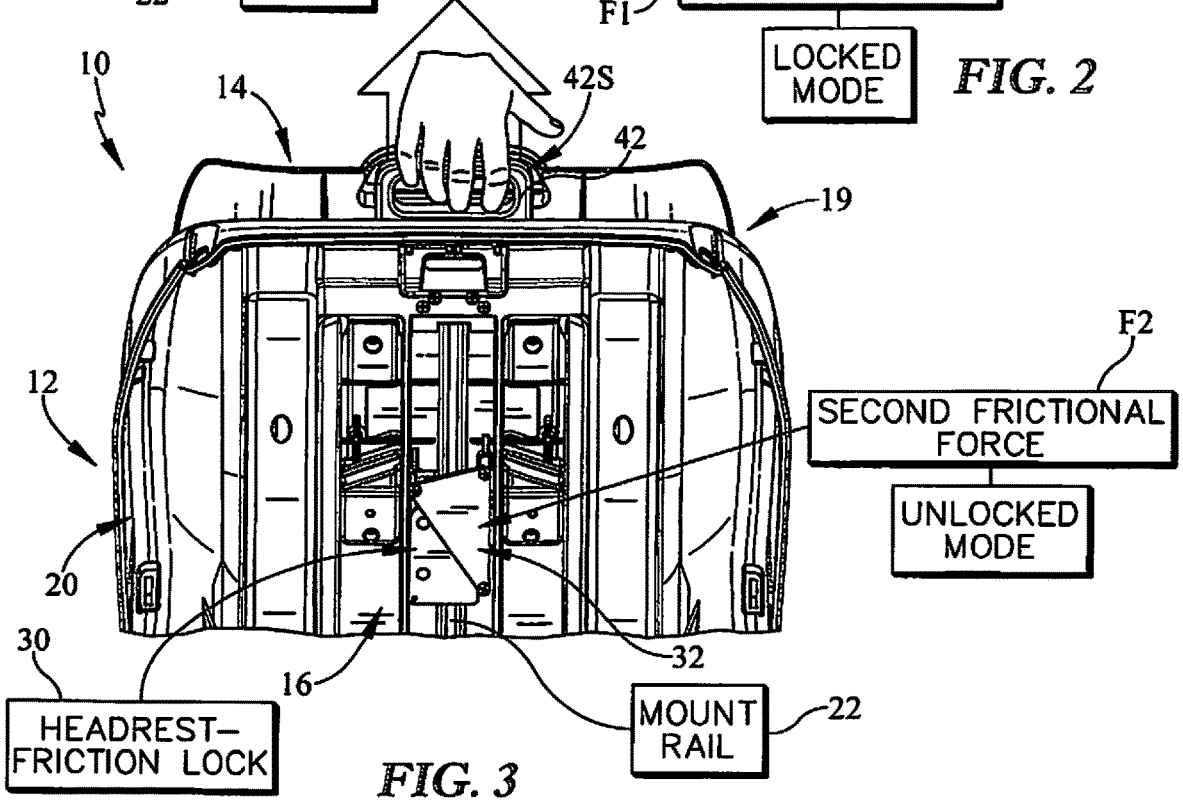

Headrest-height controller 16 of seat back 19 is configured to provide means for providing a releasable lock to block movement of movable headrest 14 relative to backrest 20 at each and every elevation point along a headrest-travel path above seat bottom 18 between a fully raised position and a fully lowered position as suggested in FIGS. 2 and 3. Headrest-height controller 16 allows a caregiver to locate and lock movable headrest 14 at any selected elevation point above seat bottom 18 so that the movable headrest 14 is retained in a stationary elevated position above seat bottom 28 that has been selected by the caregiver and therefore the elevation of the movable headrest 14 may be customized by the caregiver to suit the size of a specific juvenile seated on seat bottom 18 of juvenile seat 12.

Figure 4:
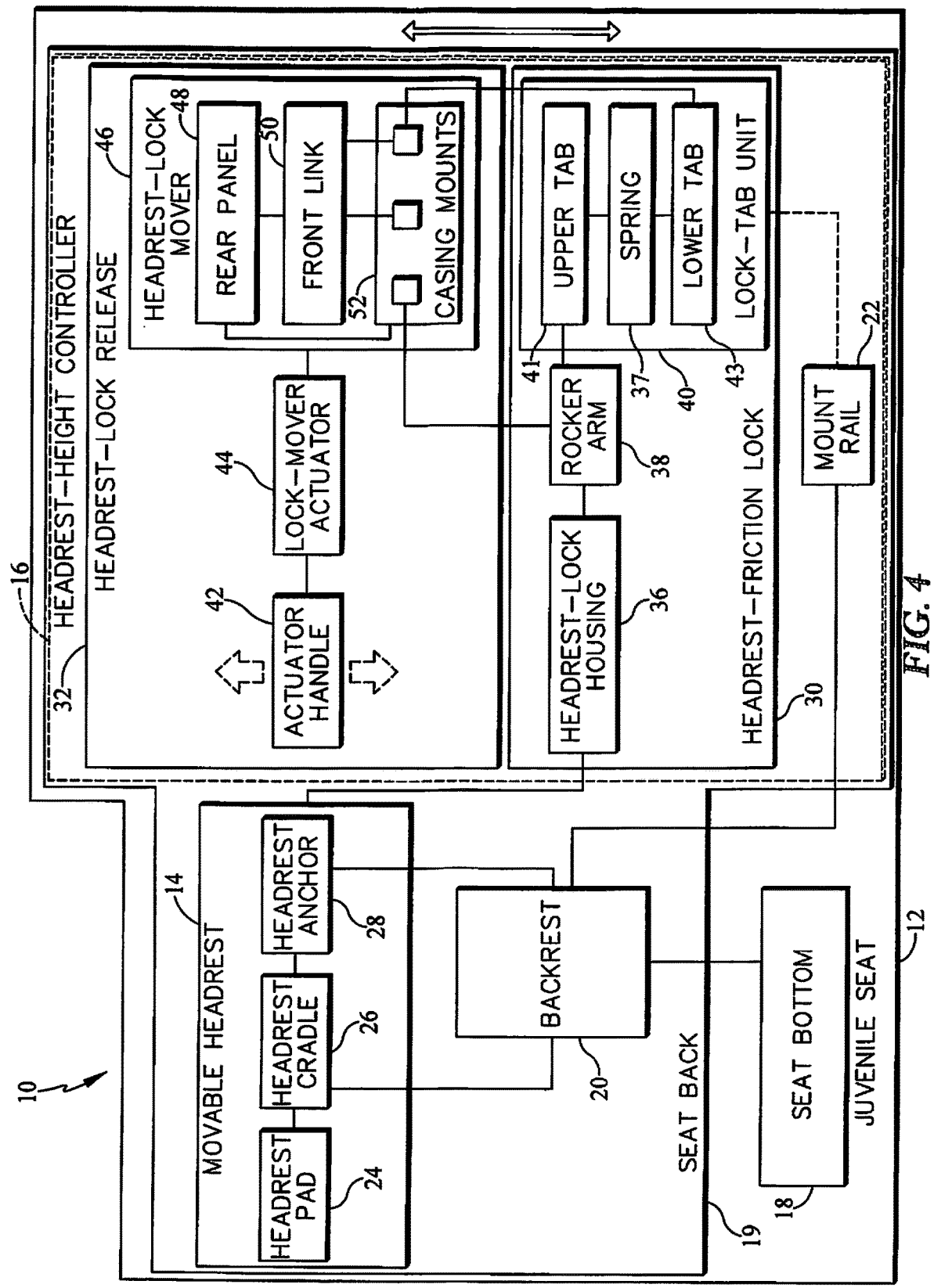
FIG. 4 is a diagrammatic view of the child restraint of FIG. 1 showing that the headrest-height controller includes the mount rail, the headrest-friction lock, and a headrest-lock release and suggesting that the headrest-friction lock is disengaged from the mount rail in response to upward movement of the actuator handle of the headrest-lock release relative to the backrest by a caregiver.
Figure 5:
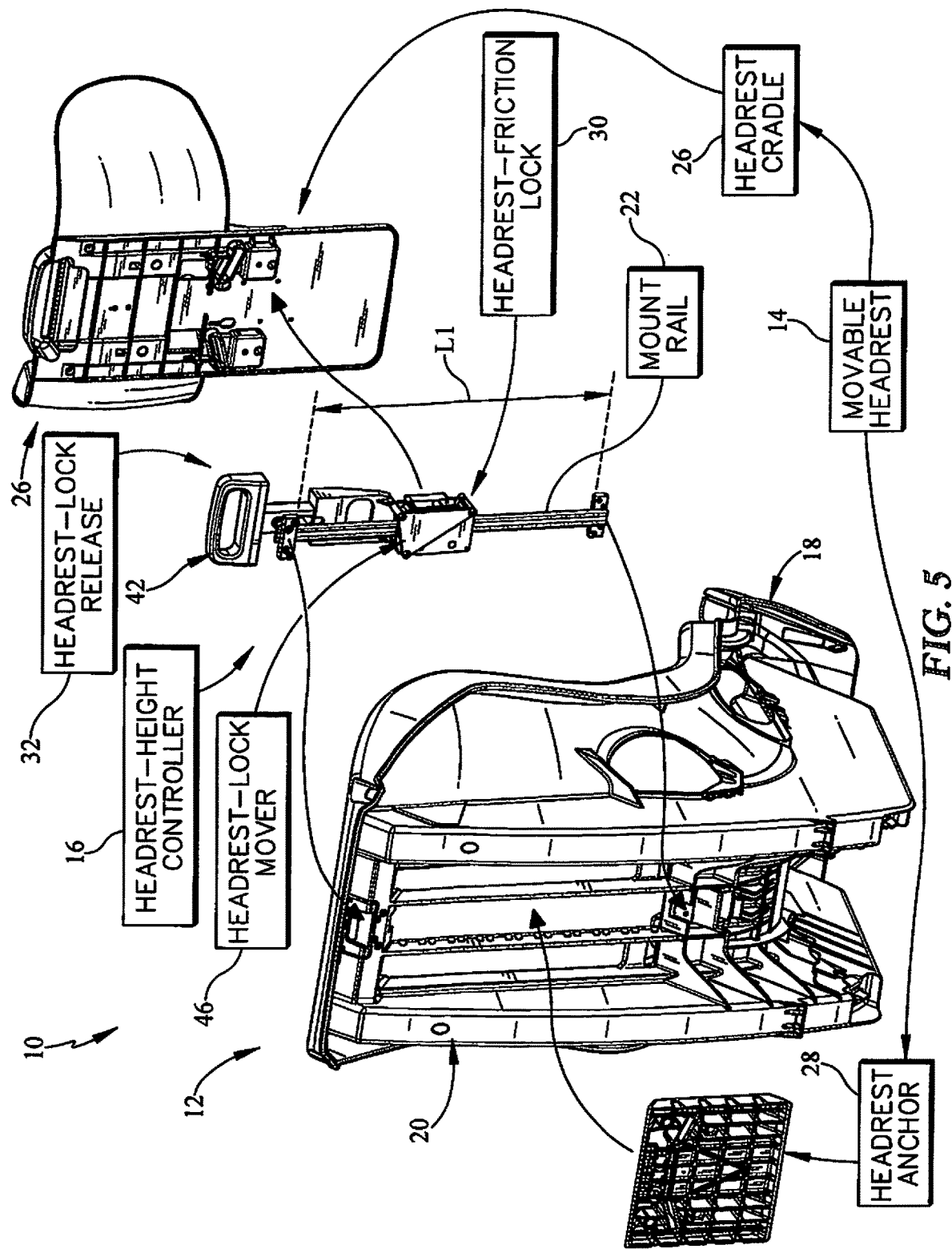
FIG. 5 is an exploded perspective assembly view of the child restraint of FIG. 1 showing that the child restraint includes, from left to right, a headrest anchor included in a movable headrest, a juvenile seat, a headrest-height controller including a headrest-lock mover, a headrest-friction lock, and a mount rail, and a headrest cradle included in the movable headrest.

Headrest-height controller 16 includes a mount rail 22 and a headrest-friction lock 30 as shown in FIGS. 4 and 5. Headrest-friction lock 30 uses friction to engage with mount rail 22 and block movement of movable headrest 14 relative to backrest 20. Mount rail 22 is coupled to backrest 20 to lie in a fixed position relative to backrest 20. Headrest-friction lock 30 is configured to block selectively movement of the movable headrest 14 relative to backrest 20 at a selected one of any and all elevation points along a length L1 of mount rail 22 when headrest-height controller 16 is in the LOCKED mode as shown in FIG. 9.

Headrest-height controller 16 is changeable by a caregiver between a LOCKED mode and an UNLOCKED mode as suggested in FIGS. 2 and 3 and 10-13B. Headrest-friction lock 30 is configured to apply a first frictional force to mount rail 22 to block movement of movable headrest 14 relative to backrest 20 when headrest-height controller 16 is in the LOCKED mode. Headrest-friction lock 30 applies a relatively smaller second frictional force to mount rail 22 to allow movement of movable headrest 14 relative to backrest 20 when headrest-height controller 16 is in the UNLOCKED mode. The second friction force may be about zero or any very low friction force sufficient to allow easy up-and-down movement of the movable headrest 14 by the caregiver when headrest-height controller 16 is in the UNLOCKED mode.

Headrest-height controller 16 further includes a headrest-lock release 32 that is configured to change headrest-height controller 16 from the LOCKED mode to the UNLOCKED mode as suggested in FIGS. 12A-13B. In one example of use, headrest-height controller 16 begins in the LOCKED mode in which the first frictional force is applied to mount rail 22 as suggested in FIGS. 12A and 12B. A caregiver desiring to move movable headrest 14 engages headrest-lock release 32 in accordance with the present disclosure to change headrest-height adjuster 16 to the UNLOCKED mode. As a result, headrest-friction lock 30 moves relative to mount rail 22 so that the relatively lower second frictional force is now applied to mount rail 22 as suggested in FIGS. 13A and 13B. The caregiver, while still engaging the headrest-lock release 32, is free to move movable headrest 14 up-and-down on mount rail 22 relative to backrest 20 to any and all points along length L1 of mount rail 22. Once movable headrest 14 is located at a desired elevated position on backrest 20 and a selected point on mount rail 22, the caregiver stops engaging headrest-lock release 32 to allow headrest-height controller 16 to return to the LOCKED mode in which headrest-friction lock 30 applies the first frictional force to mount rail 22. The desired elevated position may be any selected elevation along a headrest-travel path above seat bottom 18 and does not need to be one of a fixed or limited number of elevations so that juvenile seat 12 may be customized in the field by the caregiver to position the movable headrest 14 relative to seat bottom 18 to fit a juvenile seated on juvenile seat 12.

Figure 7:
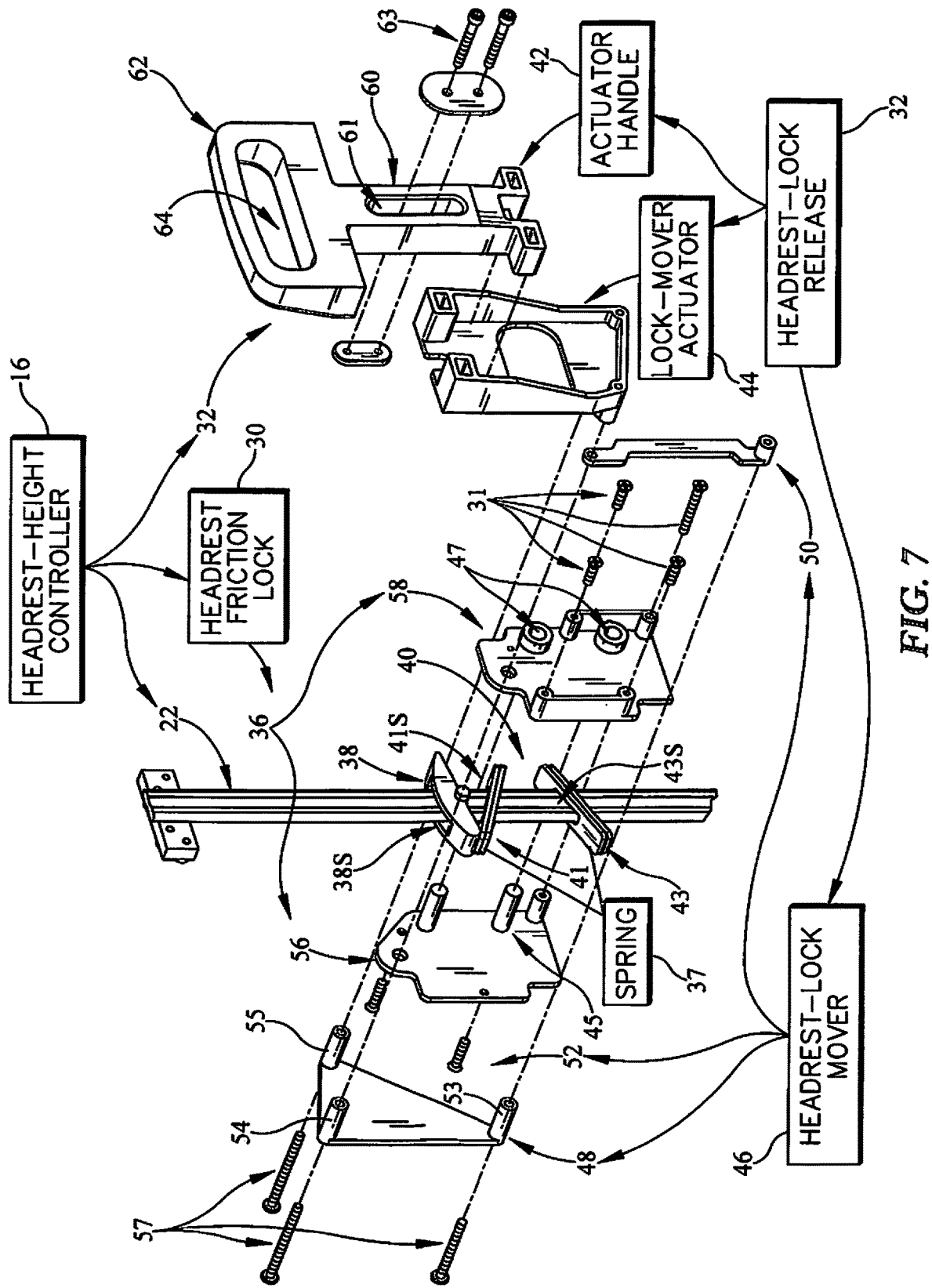
FIG. 7 is an exploded perspective assembly view of the headrest-height controller showing that the headrest-height controller includes, from left to right, a rear panel of the headrest-lock mover, a headrest-lock housing disposed on both sides of the mount rail, a rocker arm formed to include a rocker-arm space through which the mount rail is arranged to extend, upper and lower tabs of the headrest-friction lock engaging the mount rail, a lock-mover actuator, and the actuator handle.

Headrest-friction lock 30 includes a headrest-lock housing 36, a rocker arm 38, and a lock-tab unit 40 as suggested diagrammatically in FIG. 4 and shown illustratively in FIG. 7. Lock-tab unit 40 is biased into engagement with mount rail 22 to provide the first frictional force at any and all points along length L1 of mount rail 22. Headrest-lock housing 36 is fixed relative to headrest-lock release 32 until the caregiver engages the headrest-lock release 32 in accordance with the present disclosure. Rocker arm 38 is mounted to headrest-lock housing 36 for pivotable movement about a rocker-arm pivot axis 38A. When the caregiver engages the headrest-lock release 32 to shift headrest-height controller 16 to the UNLOCKED mode, headrest-lock release 32 causes rocker arm 38 and lock-tab unit 40 to move relative to mount rail 22 causing the relatively lower second friction to be applied to mount rail 22.

Figure 6:
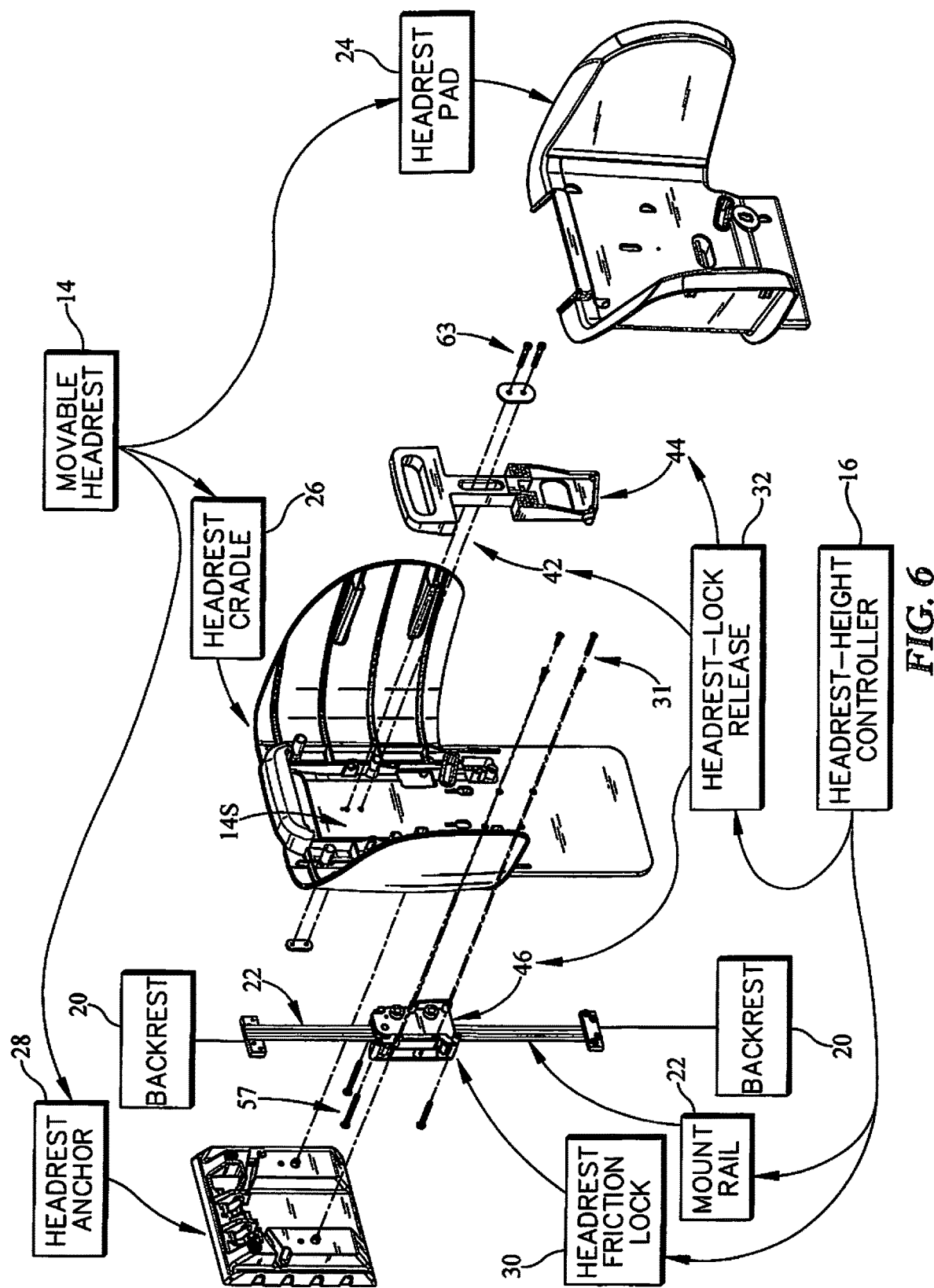
FIG. 6 is an exploded perspective assembly view of the movable headrest and the headrest-height controller showing that the movable headrest includes, from left to right, a headrest anchor, a headrest cradle, and a headrest pad, and showing that the headrest-height controller includes, from left to right, a headrest-friction lock that is coupled to a mount rail and positioned to lie between the headrest anchor and the headrest cradle and showing that the headrest-lock release is positioned to lie between the headrest cradle and the headrest pad.

Headrest-lock release 32 includes an actuator handle 42, a lock-mover actuator 44, and a headrest-lock mover 46 as suggested diagrammatically in FIG. 4 and shown illustratively in FIGS. 5 and 6. Actuator handle 42 provides means for shifting lock-mover actuator 44 and headrest-lock mover 46 upwardly relative to headrest-friction lock 30 in response to application of an upward lifting force to actuator handle 42 by the caregiver. Lock-mover actuator 44 interconnects actuator handle 42 and headrest-lock mover 46 as suggested in FIG. 4. Headrest-lock mover 46 translates relative to headrest-lock housing 36 to move lock-tab unit 40 out of engagement with mount rail 22 and provide the relatively lower second friction force to mount rail 22.

A caregiver may shift headrest-lock release 32 relative to headrest-friction lock 30 by pulling actuator handle 42 upwardly as shown in FIG. 3. The upward movement of actuator handle 42 causes headrest-lock mover 46 to move rocker arm 38 and lock-tab unit 40 simultaneously. Rocker arm 38 and headrest-lock mover 46 cooperate to move the lock-tab unit 40 out of engagement with mount rail 22 so that movable headrest 14 may be adjusted upwardly or downwardly relative to mount rail 22 and backrest 20 by the caregiver.

In accordance with the illustrative embodiment, juvenile seat 12 is configured to support an occupant within a vehicle and includes a seat bottom 18 and a seat back 19 that is arranged to extend upwardly away from seat bottom 18 as suggested in FIG. 1. Seat back 19 includes backrest 20, movable headrest 14, and headrest-height controller 16. Movable headrest 14 is arranged to move up and down along backrest 20 to accommodate seat occupants of different sizes. Headrest-height controller 16 is configured to change from a LOCKED mode in which up-and-down movement of the movable headrest 14 relative to backrest 20 is blocked as suggested in FIG. 2 to a UNLOCKED mode in which up-and-down movement of the movable headrest 14 is permitted relative to backrest 20 as suggested in FIG. 3.

Movable headrest 14 is coupled to backrest 20 by means of headrest-height controller 16 as shown in FIGS. 4 and 5. Headrest-height controller 16 locks movable headrest 14 in a fixed position relative to backrest 20 when headrest-height controller 16 is in the LOCKED mode and disengages from mount rail 22 to allow up-and-down movement of movable headrest 14 relative to backrest 20 when headrest-height controller 16 is in the UNLOCKED mode. Movable headrest 14 is movable from a fully raised position along length L1 to a fully lowered position along length L1 and can be locked by the caregiver at any selected elevation point on backrest 20 between the fully raised position and the fully lowered position.

Movable headrest 14 may be moved up and down along backrest 20 by a caregiver to accommodate juvenile occupants of different sizes as shown in FIGS. 2 and 3. Movable headrest 14 includes a headrest pad 24, a headrest cradle 26, and a headrest anchor 28 as suggested diagrammatically in FIG. 4 and shown illustratively in FIG. 6. Headrest pad 24 is configured to support a head of an occupant when child restraint 10 is in use. Headrest cradle 26 is coupled to headrest pad 24 to move therewith and is arranged to be in spaced-apart relation to headrest anchor 28. Backrest 20 is located between headrest anchor 28 and headrest cradle 26. Headrest anchor 28 is configured to move with headrest cradle 26 and headrest pad 24 along backrest 20 and is configured to block or limit access to headrest-height controller 16.

Headrest-height controller 16 is configured to lock movable headrest 14 at any selected elevation point along length L1 of mount rail 22 as suggested in FIG. 5. Headrest-height controller 16 includes mount rail 22, headrest-friction lock 30, and headrest-lock release 32. Actuator handle 42 of headrest-lock release 32 may be moved relative to the headrest-friction lock 30 to establish the LOCKED mode or the UNLOCKED mode of headrest-height controller 16. Mount rail 22 is coupled to backrest 20 in a fixed position relative to backrest 20. Headrest-friction lock 30 provides a friction or interference fit on mount rail 22 to block movement of movable headrest 14 relative to backrest 20 while headrest-height controller 16 is in the LOCKED mode as shown in FIG. 2. Actuator handle 42 of headrest-lock release 32 may be moved upwardly relative to headrest-friction lock 30 by a caregiver to change headrest-height controller 16 from the LOCKED mode to the UNLOCKED mode in which headrest-friction lock 30 disengages mount rail 22 as shown in FIG. 3.

Headrest-friction lock 30 includes headrest-lock housing 36, rocker arm 38, and lock-tab unit 40 as suggested diagrammatically in FIG. 4 and shown illustratively in FIG. 7. Headrest-lock housing 36 is coupled to headrest cradle 26 of movable headrest 14 to move therewith. A plurality of headrest fasteners 31 extend through headrest cradle 26 and into headrest-lock housing 36 to couple movable headrest 14 to headrest-friction lock 30 as suggested in FIG. 6.

Rocker arm 38 is formed to include a rail space 38S through which mount rail 22 is arranged to extend therethrough as shown in FIG. 7. Rocker arm 38 is coupled to headrest-lock housing 36 and is pivotable relative to headrest-lock housing 36 about a rocker-arm pivot axis 38A as headrest-height controller 16 changes from the LOCKED mode as shown in FIG. 9 to the UNLOCKED mode as shown in FIG. 11.

Lock-tab unit 40 engages mount rail 22 within headrest-lock housing 36 to provide the friction or interference fit at any selected point along length L1 of mount rail 22 when headrest-height controller 16 is in the LOCKED mode and disengages mount rail 22 when headrest-height controller 16 is in the UNLOCKED mode as shown in FIGS. 10-13B. In one example, lock-tab unit 40 provides a first frictional force F1 when headrest-height controller 16 is in the LOCKED mode and a relatively smaller second frictional force F2 when headrest-height controller 16 is in the UNLOCKED mode. The first frictional force is sufficient to block up-and-down movement of the movable headrest 14 relative to backrest 20. The second frictional force is sufficiently small to allow up-and-down movement of movable headrest 14 relative to backrest 20. In some examples within the scope of the present disclosure, the second frictional force may be zero.

Lock-tab unit 40 disengages mount rail 22 as headrest-lock release 32 is moved upwardly relative to backrest 20 and headrest-lock housing 36 as shown in FIGS. 11, 13A, and 13B. Lock-tab unit 40 includes an upper lock tab 41, a lower lock tab 43, and a spring 37 as suggested diagrammatically in FIG. 4 and shown illustratively in FIG. 7. Upper lock tab 41 is located in spaced-apart relation above lower lock tab 43 along mount rail 22. Upper lock tab 41 is arranged to lie between rocker arm 38 and lower lock tab 43. In one example, upper lock tab 41 and lower tab 43 are biased away from one another by spring 37 to lock tabs 41, 43 against mount rail 22 in the LOCKED mode with the first frictional force. In other embodiments, any suitable biasing means and methods may be used in accordance with the present disclosure.

In one illustrative example, upper lock tab 41 is oriented to lie in a positively sloping direction as shown in FIG. 12B. Lower lock tab 43 is oriented to lie in a negatively sloping direction as shown in FIG. 12B. When headrest-height controller 16 shift from the LOCKED mode to the UNLOCKED mode, the orientation of upper lock tab 41 changes to cause upper lock tab 41 to lie in a shallower positively sloping direction and the orientation of the lower lock tab 43 changes to cause lower lock tab 43 to lie in a shallower negatively sloping direction as shown in FIG. 13B.

Upper lock tab 41 includes a converging-tab edge 41C and lower lock tab 43 has a converging-tab edge 43C spaced apart from one another a distance D3 as shown in FIG. 12B. Upper lock tab 41 and lower lock tab 43 further include respective diverging-tab edges 41D, 43D spaced apart from one another a distance D1 when headrest-height controller 16 is in the LOCKED mode as shown in FIG. 12B. Converging-tab edges 41C, 43C are spaced apart vertically from one another a generally fixed distance D3 and maintain the distance D3 relative to one another by supports 45 included in headrest-lock housing 36 as shown in FIGS. 12B and 13B. As headrest-lock release 32 is moved upwardly relative to headrest-lock housing 36, diverging-tab edges 41D, 43D are moved closer together to change headrest-friction lock 30 from the LOCKED mode to the UNLOCKED mode.

Upper lock tab 41 and lower lock tab 43 are formed to include rail spaces 41S, 43S, respectively, therein and mount rail 22 is arranged to extend there through as shown in FIGS. 12B and 13B. Rail spaces 41S and 43S are defined, in part, by left tab-locking surfaces 41L, 43L and right tab-locking surfaces 41R, 43R. When headrest-friction lock 30 is in the LOCKED mode, left and right tab-locking surfaces 41L, 43L, 41R, 43R engage mount rail 22 to lock movable headrest 14 in place at each and every point along the length L1 of mount rail 22 as shown in FIGS. 12A and 12B. When headrest-friction lock 30 is in the UNLOCKED mode, left and right tab-locking surfaces 41L, 43L, 41R, 43R are disengaged from mount rail 22 to allow movement of movable headrest 14 along mount rail 22 relative to backrest 20 as shown in FIGS. 13A and 13B.

Spring 27 of lock-tab unit 40 biases diverging-tab edges 41D, 43D away from one another to cause left and right tab-locking surfaces 41L, 43L, 41R, 43R to apply the first frictional force on mount rail 22 in the LOCKED mode as suggested in FIG. 12B. Diverging-tab edges 41D, 43D are spaced apart from one another a distance D1 when headrest-height controller 16 is in the LOCKED mode. When headrest-lock release 32 translates relative to headrest-friction lock 30, lock-tab unit 40 is moved such that spring 37 is compressed by tabs 41, 43 in the UNLOCKED mode. Tabs 41, 43 are spaced apart from one another by a distance D2 in the UNLOCKED mode and distance D2 is less than distance D1 as shown in FIGS. 12B and 13B.

Upper lock tab 41 is arranged to lie at an angle A1 relative to a horizontal reference line R1 when headrest-height controller 16 is in the LOCKED mode as shown in FIG. 12B. Reference line R1 is generally perpendicular to mount rail 22 as shown in FIG. 12B. Lower lock tab 43 is arranged to lie at an angle A3 that is opposite angle A1 relative a horizontal reference line R2 when headrest-height controller 16 is in the LOCKED mode as shown in FIG. 12B. Horizontal reference line R2 is generally parallel to horizontal reference line R1. In one example, angle A1 is opposite but generally equal to angle A3 relative to mount rail 22. However, angle A1 may not be generally equal to angle A3.

Upper lock tab 41 is arranged to lie at an angle A2 relative horizontal reference line R1 in the UNLOCKED mode as shown in FIG. 13B. Similarly, lower lock tab 43 is arranged to lie at an angle A4 relative to horizontal reference line R2 that is opposite angle A2. Angles A2 and A4 are less than angles A1 and A3. In one example, angle A2 is opposite but generally equal to angle A4 relative to mount rail 22. However, angle A2 may not be generally equal to angle A4.

Headrest-lock release 32 includes actuator handle 42, lock-mover actuator 44, and headrest-lock mover 46 as suggested diagrammatically in FIG. 4 and shown illustratively in FIGS. 5 and 6. A caregiver uses actuator handle 42 to operate headrest-height controller 16 as shown in FIG. 3. Actuator handle 42 is positioned to lie within a headrest space 14S formed between headrest pad 24 and headrest cradle 26. Lock-mover actuator 44 is coupled to actuator handle 42 and is arranged to extend downwardly from actuator handle 42 within headrest space 14S as shown in FIG. 6. Headrest-lock mover 46 is coupled to lock-mover actuator 44 and engages headrest-friction lock 30. Headrest-lock mover 46 is translated upwardly relative to move headrest-friction lock 30 relative to mount rail 22 during change of headrest-height controller 16 from the LOCKED mode as shown in FIGS. 9 and 12B to the UNLOCKED mode as shown in FIGS. 11 and 13B.

Headrest-lock mover 46 is pulled upwardly by a caregiver squeezing actuator handle 42 within a handle space 42S to minimize handle space 42S as shown in FIG. 3. Headrest-lock mover 46 includes a rear panel 48, a front link 50, and a plurality of casing mounts 52 as suggested diagrammatically in FIG. 4 and shown illustratively in FIG. 7. Rear panel 48 has a triangular shape and is positioned between headrest anchor 28 and headrest-friction lock 30 as suggested in FIG. 5 and shown in FIG. 6. While rear panel 48 has a triangular shape, any other suitable shape may be used within the scope of the present disclosure. Front link 50 is positioned between headrest cradle 26 and headrest-friction lock 30 as shown in FIG. 6. The plurality of casing mounts 52 are coupled at each end of rear panel 48 and cooperate to move headrest-friction lock 30 relative to mount rail 22 during change of headrest-height controller 16 from the LOCKED mode to the UNLOCKED mode as headrest-lock mover 46 is pulled upwardly relative to headrest-friction lock 30.

The plurality of casing mounts 52 interact with headrest-friction lock 30 to move rocker arm 38 and lock-tab unit 40 and cause headrest-friction lock 30 to change from the LOCKED mode to the UNLOCKED mode as shown in FIGS. 12A and 13A. Illustratively, the plurality of casing mounts 52 includes a first casing mount 53, a second casing mount 54, and a third casing mount 55 as shown in FIG. 7. First casing mount 53 and third casing mount are coupled to lock-mover actuator 44 so that headrest-lock mover 46 is pulled upward as actuator handle 42 is operated by a caregiver. A plurality of fasteners 57 extend through each casing mount to couple the rear panel 48 to the front link 50 and the headrest-lock mover 46 to the lock-mover actuator 44 as suggested in FIG. 7.

Each casing mount 53, 54, 55 is configured to move upwardly relative to headrest-friction lock 30 in unison when a caregiver applies a lifting force to actuator handle 42 to cause actuator handle 42 to move within handle space 42S as shown in FIGS. 12B and 13B. First casing mount 53 is coupled to diverging-tab edge 43D of lower lock tab 43. Second casing mount 54 is coupled to a right side 38R of rocker arm 38. Third casing mount 54 is coupled to a left side 38L of rocker arm 38.

When a caregiver SQUEEZES or otherwise moves actuator handle 42 within handle space 42S, first casing mount 53 pulls diverging-tab edge 43D upward toward upper lock tab 41 as shown in FIG. 13A. At the same time, third casing mount 55 pulls the left side 38L of rocker arm 38 upward so that rocker arm 38 pivots about rocker-arm pivot axis 38A. As rocker arm 38 pivots about rocker-arm pivot axis 38A, the right side 38R of rocker arm 38 pushes diverging-tab edge 41D downwardly toward lower tab 43. These simultaneous motions cause diverging-tab edges 41D, 43D to move closer to one another and cause tab-locking surfaces 41L, 43L, 41R, 43R to disengage from mount rail 22 so that movable headrest 14 may move upwardly or downwardly along backrest 20 of juvenile seat 12.

Headrest-lock housing 36 includes a rear panel 56, a front panel 58, and supports 45 that extend from rear panel 56 to front panel 58 as shown in FIG. 7. Rear panel 56 is positioned to lie between mount rail 22 and rear panel 48 of headrest-lock mover 46. Front panel 58 is positioned to lie between mount rail 22 and headrest cradle 26 and is configured to receive headrest fasteners 31 that couple headrest cradle 26 to headrest-lock housing 36. Supports 45 extend from rear panel 56 and are received within complementary support apertures 47 formed in front panel 58.

Supports 45 include an upper support 49 and a lower support 51 as shown in FIGS. 12A-13B. Upper support 49 engages converging-tab edge 41C of upper lock tab 41. Lower support 51 engages converging-tab edge 43C of lower lock tab 43. In one example, a compression spring is disposed between converging-tab edges 41C, 43C to retain converging-tab edges 41C, 43C against upper support 49 and lower support 51. In another example, converging-tab edges 41C, 43C are coupled to upper support 49 and lower support 51.

Actuator handle 42 includes an extension 60 and a grip 62 as shown in FIG. 7. Extension 60 engages lock-mover actuator 44 and is formed to include a slot 61. Fasteners 63 extend through slot 61 to couple actuator handle 42 to movable headrest 14 while still allowing vertical movement of actuator handle 42 as suggested in FIG. 6. In one embodiment, actuator handle 42 moves relative to lock-mover actuator 44 prior to extension 60 engaging lock-mover actuator 44. Grip 62 is formed to include an opening 64 through which a caregiver can move actuator handle 42.

The illustrative embodiment provides a friction lock to block movement of movable headrest 14 at each and every point along length L1 of mount rail 22. Other headrest locks such as, for example, bar-and-notch locks or key-and-slot locks are not friction locks.

In illustrative embodiments, headrest-height controller 16 maximizes fit to the occupant by allowing for any and all elevation positions of movable headrest 14 on backrest 20 along the range of motion from the fully raised position to the fully lowered position as suggested in FIGS. 1-3. Two lock tangs 41, 43 (also called lock tabs 41, 43) prohibit adjustment of movable headrest 14 in upward and downward directions relative to backrest when headrest-height controller 16 is not actuated. The lock tangs are spring loaded to maintain lock on a bar 22 (also called mount rail 22). Combined, lock tangs 41, 43 prohibit upward and downward movement on bar 22 and even axial rotation relative to bar 22. In another embodiment, headrest-height controller 16 may be incorporated into other product components such as, for example, a seat recliner.

In illustrative embodiments, lock bracket 48 (also called rear panel 48) and unlock bracket 50 (also called front link 50) are made from stamped steel or aluminum. However, lock bracket 48 and unlock bracket 50 may be made from alternative materials depending on the usage of the mechanism. Lock bracket 48 and unlock bracket 50 combine to move lock tang 43 and rocker arm 38 simultaneously when actuator handle 42 is pulled upwardly by a caregiver. Rocker arm 38 in turn will actuate lock tang 41. An inner clamp 36 (also called headrest-lock housing 36) may be a stamped steel part that acts as position restriction and containment of the lock tangs and includes a pivot point for rocker arm 38.

In illustrative embodiments, lock tangs 41, 43 are made from stamped steel. Lock tangs 41, 43 may be single, double, or triple-stacked steel plates that combine to engage bar 22. Additional stacking of lock tangs 41, 43 increases the load capability to prohibit movement of movable headrest 14 along bar 22. Lock tangs 41, 43 are held in their outer position by springs. A coil type spring positioned to lie between the lock tangs 41, 43 allows for a constant force applied to the lock tangs 41, 43 and provides the friction-locking function on bar 22.

In illustrative embodiments, rocker arm 38 is made from a polymer such as, for example, polyoxymethylene (POM). Rocker arm 38 actuates the lock tang 41 to release from bar 22. Actuator handle 42 may be a piece of molded polymer. Actuator handle 42 couples to the lock bracket 48 and unlock bracket 50 to initiate their movement and unlock headrest-height controller 16.

In illustrative embodiments, bar 22 may be an extruded steel rail that will be the core structure for locking. Bar 22 also offers the axial tracking of headrest-height controller 16. A length L1 of bar 22 may be related to the required movement of the movable headrest 14.

In illustrative embodiments a child restraint 10, according to the present disclosure, includes a juvenile seat 12 and a child-restraint harness 11 as shown in FIG. 1. The juvenile seat 12 includes a seat bottom 18 and a seat back 19. The seat back 19 a backrest 20, a movable headrest 14 coupled to the backrest 20, and a headrest-height controller 16. Headrest-height controller 16 includes means for providing a lock to block movement of movable headrest 14 on backrest 20 at each and every elevation point between a fully raised position and a fully lowered position.

The invention claimed is:

1. A juvenile seat comprising:
   a seat bottom and
   a seat back arranged to extend upwardly away from the seat bottom, the seat back including a backrest coupled to the seat bottom in a fixed position relative to the seat bottom, a movable headrest coupled to the backrest for continuous up-and-down movement along the backrest relative to the backrest along a headrest-travel path, and a headrest-height controller arranged to extend between and interconnect the backrest and the movable headrest,
   wherein the headrest-height controller is configured to frictionally block selective movement of the movable headrest relative to the backrest at each and every elevation point along the headrest travel path between a fully raised position of the movable headrest and a fully lowered position of the movable headrest, and
   wherein the headrest-height controller includes an actuator handle adapted to be gripped by a caregiver to change the headrest-height controller from frictionally blocking selective movement of the movable headrest relative to the backrest to allowing selective movement of the movable headrest relative to the backrest.

2. The juvenile seat of claim 1, wherein the headrest-height controller is changeable from a locked mode in which the movable headrest is blocked from moving relative to the backrest by a first friction force to an unlocked mode in which the movable headrest is freed to move up and down along the backrest.

3. The juvenile seat of claim 2, wherein the headrest-height controller includes a mount rail coupled to the backrest in a fixed position relative to the backrest, a headrest-friction lock coupled to the mount rail and configured to provide the first frictional force to the mount rail when the headrest-height controller is in the locked mode, and a headrest-lock release coupled to the headrest-friction lock to cause the headrest-friction lock to provide a relatively smaller second frictional force to the mount rail when the headrest-height controller is in the unlocked mode.

4. The juvenile seat of claim 3, wherein the headrest-lock release includes the actuator handle, a lock-mover actuator coupled to the actuator handle, and a headrest-lock mover coupled to the lock-mover actuator and arranged in engagement with the headrest-friction lock, and the headrest-lock mover is configured to translate upward relative to the headrest-friction lock in response to a caregiver pulling the actuator handle upward to disengage the headrest-friction lock from the mount rail.

5. The juvenile seat of claim 4, wherein, the headrest-friction lock mover includes a rear panel arranged to lie between the headrest-friction lock and the headrest anchor, a front link arranged to lie between the headrest-friction lock and the headrest cradle, and at least one casing mount extending from the rear panel to the front panel.

6. The juvenile seat of claim 5, wherein the at least one casing mount includes a first casing mount that extends from the rear panel to the lock mover actuator, a second casing mount extending from the rear panel to the lock-mover actuator and coupled to a first end of the front link, and a third casing mount that extends from the rear panel to a second end of the front link.

7. The juvenile seat of claim 3, wherein the second frictional force is about zero.

8. The juvenile seat of claim 2, wherein the headrest-friction lock includes a headrest-lock housing, a rocker arm, and a lock-tab unit contained within the headrest-lock housing, the lock-tab unit includes at least one lock tab formed to include a lock-tab space and the mount rail extends through the lock-tab space, the at least one lock tab is arranged to lie at a first angle relative to the mount rail so that left and right tab-locking surfaces of the at least one lock tab engage the mount rail and provide the first frictional force when the headrest-height controller is in the locked mode.

9. The juvenile seat of claim 8, wherein the at least one tab is arranged to lie at a second angle relative to the mount rail in the unlocked mode and the left and right tab-locking surfaces are freed from the mount rail when the at least one tab is arranged to lie at the second angle, and the first angle is greater than the second angle.

10. The juvenile seat of claim 8, wherein the lock-tab unit includes an upper lock tab and a lower lock tab positioned to lie below the upper lock tab, the upper lock tab is arranged to lie at a first angle relative to the mount rail in the locked mode, and the lower lock tab is arranged to lie at a second angle relative to the mount rail in the locked mode opposite the first angle.

11. The juvenile seat of claim 10, wherein the upper lock tab and the lower lock tab each include first and second sides and the second side of the upper tab and the second side of the lower tab are spaced apart from one another a first distance in the locked mode and are spaced apart from one another a second distance in the unlocked mode and the first distance is larger than the second distance.

12. The juvenile seat of claim 11, wherein the lock-tab unit further includes at least one biasing spring arranged to lie in engagement with the upper lock tab and the lower lock tab such that the second side of the upper tab and the second side of the lower tab are biased apart from one another and into engagement with the mount rail to provide the first frictional force on the mount rail.

13. The juvenile seat of claim 8, wherein the headrest-lock housing includes a rear panel coupled to the headrest anchor, a front panel coupled to the headrest, and at least one support that extends from the rear panel to the front panel and supports the lock-tab unit.

14. The juvenile seat of claim 8, wherein the rocker arm is coupled to the headrest-lock housing for pivotable movement about a rocker-arm pivot axis as the headrest-height controller changes from the locked mode to the unlocked mode.

15. The juvenile seat of claim 14, wherein the rocker arm includes a first side in engagement with the lock-tab unit and a second side in engagement with the headrest-lock release and the rocker arm is configured to pivot about the rocker-arm pivot axis as the headrest-lock release shifts upward relative to the headrest-friction lock so that the second side of the rocker arm moves upward with the headrest-lock release and the first side of the rocker arm moves downward and pushes the lock-tab unit out of engagement with the mount rail.

16. A juvenile seat comprising:
a seat bottom and
a seat back coupled to the seat bottom and arranged to extend upwardly away from the seat bottom, the seat back including a backrest coupled to the seat bottom to lie a fixed position relative to the seat bottom, a movable headrest coupled to the backrest for continuous up-and-down movement along the backrest, and a headrest-height controller including a mount rail coupled to the backrest in a fixed position relative to the backrest, a headrest-friction lock configured to selectively engage the mount rail, and a headrest-lock release configured to move relative to the headrest-friction lock to disengage the headrest-friction lock from the mount rail to allow movement of the movable headrest along the seat back,
wherein the headrest-lock release includes an actuator handle adapted to be gripped by a caregiver to cause the headrest-friction lock to disengage from the mount rail.

17. The juvenile seat of claim 16, wherein the headrest-friction lock includes a headrest-lock housing, a rocker arm, and a lock-tab unit located in a space formed in the headrest-lock housing, the lock-tab unit is configured to provide a first frictional force on the mount rail when the headrest-height controller is in a locked mode and a second frictional force on the mount rail when the headrest-height controller is in an unlocked mode and the second frictional force is less than the first frictional force.

18. The juvenile seat of claim 17, wherein the lock-tab unit includes at least one lock tab formed to include a lock-tab space and the mount rail is arranged to extend through the lock-tab space, the lock tab is arranged to lie at a first angle relative to the mount rail to cause left and right tab-locking surfaces of the at least one lock tab to engage the mount rail when the headrest-height controller is arranged in the locked mode, and the lock tab is arranged to lie a second angle relative to the mount rail to cause the left and right tab-locking surface of the at least one lock tab to be freed from the mount rail when the headrest-height controller is arranged in the unlocked mode.

19. The juvenile seat of claim 18, wherein the lock-tab unit includes an upper lock tab arranged to lie at an angle relative to the mount rail and a lower lock tab arranged to lie below the upper lock tab and arranged to lie at an angle relative to the mount rail opposite the upper lock tab such that a first side of the upper lock tab and a first side of the lower lock tab converge toward one another and a second side of the upper lock tab and a second side of the lower tab diverge away from one another.

20. The juvenile seat of claim 19, wherein the second side of the upper tab and the second side of the lower tab are spaced apart from each other a first distance in the locked mode and are spaced apart from one another a second distance in the unlocked mode and the first distance is larger than the second distance.

21. The juvenile seat of claim 16, wherein the movable headrest includes a headrest cradle arranged to lie alongside a front face of the backrest and a headrest anchor located in spaced-apart relation to the headrest cradle to locate the backrest between the headrest anchor and the headrest cradle and coupled to the headrest cradle to move therewith.

22. A juvenile seat comprising:
a seat bottom and
a seat back including a backrest arranged to extend upwardly from the seat bottom, a movable headrest mounted on the backrest for continuous up-and-down movement relative to the backrest along a headrest-travel path between a fully lowered position arranged to lie at a first distance above the seat bottom and a fully raised position arranged to lie at a relatively greater second distance above the seat bottom, and a headrest-height controller arranged to interconnect the backrest and the movable headrest and configured to be operated by a caregiver to change from a locked mode in which up-and-down movement of the movable headrest along the headrest-travel path is blocked to establish an elevation of the movable headrest at a selected one of any and all elevation points along the headrest-travel path to an unlocked mode in which the movable headrest is free to move up-and-down on the backrest relative to the seat bottom along the headrest-travel path at the option of the caregiver, and wherein
the headrest-height controller includes a mount rail coupled to the backrest and arranged to extend along the headrest-travel path, a headrest-friction lock including a headrest-lock housing, a rocker arm on the headrest-lock housing for pivotable movement about a rocker-arm pivot axis as the headrest-height controller changes from the locked mode to the unlocked mode and vice-versa, and lock-tab unit means for selectively engaging the mount rail when the headrest-height controller is in the locked mode to apply a first frictional force to the mount rail at any elevation point on the mount rail along the headrest-travel path selected by a caregiver to block further up-and-down movement of the movable headrest along the headrest-travel path and retain the movable headrest at an elevation point selected by the caregiver when the headrest-height controller is in the locked mode, and a headrest-lock release including an actuator handle mounted for up-and-down movement relative to the backrest, a head-rest-lock mover coupled to the rocker arm of the headrest-friction lock, and a lock-mover actuator coupled to the actuator handle and to the headrest-lock mover and configured to pivot the rocker arm about the rocker-arm pivot axis in response to upward movement of the actuator handle away from the seat bottom during change of the headrest-height controller from the locked mode to the unlocked mode to cause the lock-tab unit means to apply a relatively lower second frictional force to the mount rail temporarily to free the movable headrest for continuous up-and-down on the headrest-travel path under the control of the caregiver to assume a different elevation position.

\* \* \* \* \*